United States Patent [19]

Alajoutsijärvi et al.

[11] Patent Number: 4,825,520
[45] Date of Patent: May 2, 1989

[54] METHOD FOR STABILIZING A GLIDE SHOE OF A ROLL ADJUSTABLE IN ZONES, A ROLL MAKING USE OF THIS METHOD, AND A HYDRODYNAMIC OR HYDROSTATIC GLIDE SHOE FOR THE ROLL

[75] Inventors: Juhani Alajoutsijärvi, Jyväskylä; Juha Ehrola, Jyväskylä; Antti Ilmarinen, Jyväskylä; Matti Verkasalo, Oulu, all of Finland

[73] Assignee: Valmet Oy, Finland

[21] Appl. No.: 13,448

[22] Filed: Feb. 11, 1987

[30] Foreign Application Priority Data

Feb. 12, 1986 [FI] Finland ................. 860644

[51] Int. Cl.⁴ ............................... B21B 13/02
[52] U.S. Cl. ................... 29/116.1; 100/170; 384/118
[58] Field of Search ............... 29/116.1, 113.1, 116.2, 29/113.2, 129.5, 130; 100/170; 384/113, 114, 118

[56] References Cited

U.S. PATENT DOCUMENTS

4,091,517 5/1978 Lehmann et al. ............. 29/116 AD
4,280,262 7/1981 Ahrweiler ..................... 29/116 AD
4,394,793 7/1983 Pav et al. ...................... 29/116 AD
4,472,865 9/1984 Schiel et al. .................. 29/116 AD Primary Examiner—Howard N. Goldberg
Assistant Examiner—Irene Cuda
Attorney, Agent, or Firm—Steinberg & Raskin

[57] ABSTRACT

Method for stabilizing a glide shoe loaded against an inner face of a revolving mantle of a roll adjustable in zones. The glide shoe is supported by an articulated joint on a piston which loads the glide shoe with adjustable pressure. In order to ensure lubrication of the glide face between the glide shoe and the inner face of the roll mantle, within an area of a front edge of the glide face as seen in a direction of rotation of the roll mantle, a shifting and/or steepening of compression pressure applied by the glide shoe through lubricant onto the inner face of the roll mantle is produced by means of a wedge space within the front edge of the glide face, said shifting and/or steepening in turn generating a moment having a direction opposite to a direction of a moment produced by frictional force of the glide face of the shoe. The thickness of the lubricant film is increased by this moment in the area of the front side of the glide face. Moreover, a glide shoe and a press roll or calender roll adjustable in zones for a paper machine make use of the method described.

22 Claims, 5 Drawing Sheets

METHOD FOR STABILIZING A GLIDE SHOE OF A ROLL ADJUSTABLE IN ZONES, A ROLL MAKING USE OF THIS METHOD, AND A HYDRODYNAMIC OR HYDROSTATIC GLIDE SHOE FOR THE ROLL

BACKGROUND OF THE INVENTION

The invention is directed to a method for stabilizing glide shoes loaded against an inner face of a rotating mantle of a roll having adjustable pressure zones, in which the glide shoes are supported by means of an articulated joint or equivalent on pistons or equivalent which load the glide shoes with adjustable pressure.

The present invention is also directed to a hydrostatic or substantially hydrodynamic glide shoe intended for carrying out the method of the present invention in which the glide shoe comprises one or several lubrication chambers, into which pressurized lubricant is passed by means of which the glide face of the glide shoe is lubricated.

The present invention is additionally directed to a roll for a paper machine having adjustable pressure zones, for the above method of the present invention, and/or utilizing the above glide shoes in accordance with the present invention, such as a press roll or a calender roll. This paper machine roll comprises a revolving mantle and a stationary axle fitted inside the mantle, with a number of cylindrical bores or equivalent in the axle which can be loaded by means of a pressurized medium, and in which pistons or equivalent are situated. The pistons or equivalent substantially centrally load the glide shoes against an inner face of the revolving cylindrical mantle, through articulated joints or equivalent.

In paper machines, several such rolls are used to form, e.g. a dewatering press nip, a smoothing nip, or a calendering nip with a counter-roll. In these purposes of use, it is important that the distribution of the linear load, i.e. the pressure profile of a nip over the axial direction of the rolls, must be made constant, or that this profile can be adjusted as desired, e.g., so as to control the transverse moisture profile and/or thickness profile of the web. For this purpose, various adjustable-crown or variable-crown rolls have been known in the prior art, with attempts having been made to act upon the distribution of the linear load in a nip by means of these rolls.

In the prior art, several different variable-crown rolls or adjustable-crown rolls for paper machines have been known. As a rule, these rolls each comprise a massive, stationary roll axle and a roll mantle arranged to revolve about the axle. Between the axle and the mantle, acting upon an inner face of the mantle, glide-shoe arrangements and/or pressure-fluid chambers have been fitted, such chambers being divided into several parts over the axle direction of the roll, so that the axial profile of the mantle at the nip can be aligned or adjusted as desired. As a rule, the nips formed by such rolls, such as press nips or calendering nips, are loaded by means of loading forces applied to the axle journals of the variable-crown roll and of its counter-roll. The present invention relates to such variable-crown or adjustable-crown rolls, comprising a series of glide shoes having glide faces hydrostatically lubricated by means of pressurized oil passed onto the respective glide faces.

Prior-art glide shoes of the rolls adjustable in zones, in particular in glide shoes lubricated by means of hydrostatic pressure chambers, have involved the drawback that, especially when oil film is thin, frictional force on the glide face becomes high when the running speed is increased. This frictional force causes a torque that turns the glide face around its support point, which results in making the oil film even thinner at the portion near a front edge of the glide face, with regard to a direction of rotation of the roll mantle, because stabilizing forces in the lubrication chambers are not sufficient to compensate for this torque.

In the prior-art glide shoes, attempts have been made to eliminate the problem discussed above, by shifting the support point of the glide shoe backwardly, or by feeding pressures of different magnitudes into the front and rear chambers (in the direction of rotation). This, however, results in the drawback that the glide shoe becomes asymmetric. The direction of rotation of the roll mantle cannot be reversed for this reason. Such asymmetry also results in difficulties in producing uniformed distribution of pressure on the glide shoe with varying rotational speeds and loads.

SUMMARY OF THE INVENTION

Accordingly, it is an object of the present invention to provide a new method for stabilizing a glide shoe.

It is also an object of the present invention to provide a new and improved glide shoe.

It is an additional object of the present invention to provide a roll adjustable over zones, in which the drawbacks discussed above with respect to the prior art, can be avoided by means of an easy solution.

These and other objects are attained by the present invention which is directed to a method principally characterized by producing a shifting and/or steepening of compression pressure applied by the glide shoe to the inner face of the roll mantle, by means of a wedge space or equivalent within an area of a front edge of the glide face as seen in the direction of rotation of the roll mantle, in order to ensure lubrication of the glide face of the glide shoe between the shoe and the inner face of the roll mantle. By means of the shifting and/or steepening of the applied compression pressure, a moment is produced which has a direction opposite to a direction of a moment produced by frictional force of the glide face. By means of this counter-moment, the thickness of film of lubricant is increased within the area of the front side of the glide face.

The hydrodynamic or hydrostatic glide shoe in accordance with the present invention, is principally characterized by provision of a chamfer at the front edge of the glide shoe as seen in the direction of rotation of the roll mantle, the chamfer differing from the curved form of the glide face, and with a wedge angle of the chamfer being preferably smaller than about 3°, more preferably smaller than about 1°.

According to the present invention, a chamfer is situated at least in an area of the front edge of the glide face to be lubricated of the glide shoe, said chamfer, together with the inner face of the roll mantle, defining a wedge space which becomes narrower in the direction of rotation of the roll mantle. Due to the rotation of the roll mantle, a dam pressure of lubricant is produced in the wedge space so that the pressure of the glide shoe against the inner face of the roll mantle can be made to increase at the proximity of the front edge of the glide shoe much more steeply then before, i.e. more rapidly or sooner than before. In order for the dam pressure to arise, there must be sufficient amount of lubricant available at the front side of the chamfer.

In the present invention, it is also possible, if necessary, to provide a corresponding "releasing" chamfer at a proximity of a rear edge of the glide face, with a wedge angle opening in the direction of rotation of the roll mantle. Such a "releasing" chamfer also has the effect of lowering the pressure of the glide shoe sooner than previously in the prior art. Due to this, distribution of pressure relative to a central supporting point of the glide shoe can be made asymmetric with a stress on the front part, which also produces a moment of a direction opposite to a moment produced by frictional force noted above. Thus, lubricant film within the area of the front half of the glide face can be further increased, while lubrication of the glide shoe can be ensured with varying loads, and even with heavy loads.

The wedge angle of the chamfers in accordance with the present invention, must be relatively small in order for the intended effect to be obtained. The magnitude of the wedge angle is, as a rule, smaller than about 3°, preferably smaller than about 1°.

The importance of a chamfer in accordance with the present invention, increases with increase in the speed of rotation of the roll. The chamfer provides reliable lubrication in view of swinging movement of the revolving roll mantle.

BRIEF DESCRIPTION OF THE DRAWINGS

The present invention will be described in greater detail below, with reference to certain exemplifying embodiments illustrated in the accompanying drawings, to which the present invention is not intended to be confined. In the drawings

DESCRIPTION OF THE PREFERRED EMBODIMENTS

Figure 1A:
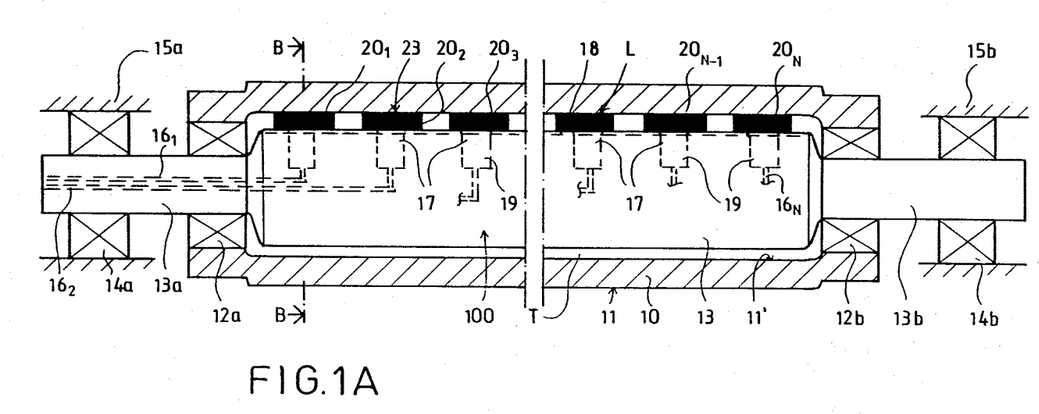
FIG. 1A is a partially sectional central axial view of a roll adjustable in zones and making use of the method and the glide shoes in accordance with the present invention.
Figure 1B:
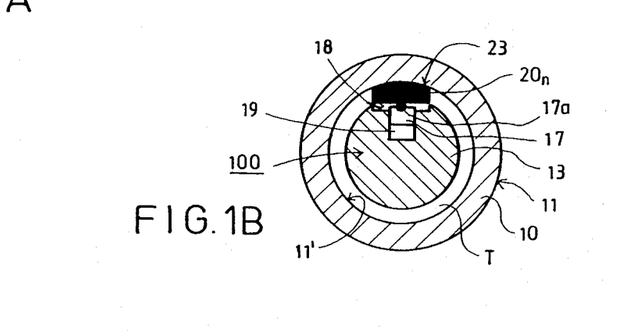
FIG. 1B is a cross-sectional view along line B—B of FIG. 1A.

FIGS. 1A and 1B schematically illustrate an example of a roll 100 adjustable in zones, e.g. a press roll or a calender roll of a paper machine, in which the method and the glide shoes in accordance with the present invention can be applied. However, the method and the glide shoes of the present invention may also be applied in connection with other types of rolls, besides the roll 100 illustrated in FIGS. 1A and 1B and further described below.

The roll 100 adjustable in zones that is shown in FIGS. 1A and 1B, comprises a massive stationary central axle 13 on which a substantially cylindrical mantle having smooth outer 11 and inner 11' faces is fitted to revolve on bearings 12a and 12b. The axle 13 includes axle journals 13a and 13b, through which the axle 13 and the roll 100 are supported, and the nip formed by the roll 100 with its counter-roll (not illustrated) is loaded. The axle journals 13a and 13b are provided with attaching links 14a and 14b, which connect the axle 13 to support and loading members 15a and 15b. Reference character "T" represents a free space between the central axle 13 and the inner surface 11' of the cylindrical mantle 10.

The stationary axle 13 is provided with a groove space 18, and, in connection therewith, a number of substantially cylindrical bores 19, in which loading pistons 17 are situated to operate. Glide shoes $20_1$ to $20_N$ are provided, in connection with each respective loading piston 17. The glide shoes are supported in a manner known in and of itself, e.g. by means of respective central articulated joints 17a. The number of the glide shoes illustrated in FIG. 1A is denoted as N pieces.

Into each substantially cylindrical bore 19, pressurized oil of controlled pressure is passed through respective pressure ducts $16_1$ to $16_N$, so that a separately adjustable pressure prevails in each cylindrical bore 19, by means of which, through the respective loading piston 17, the glide shoe 20 is pressed against the smooth inner face 11' of the cylindrical mantle 10.

By means of the pressure present in the cylindrical bores 19, the force is regulated with which the pistons 17 press the respective glide shoes $20_1$ to $20_N$ against the inner face 11' of the mantle 10, through the articulated joints 17a. In this manner, the bending of the mantle 10 of the roll 100, as well as the distribution of the linear load in the nip formed by the roll 100 with its counter-roll over the axial direction of the roll 100, are controlled.

For the purpose of lubricating the glide faces 23 of the glide shoes 20, lubricant is passed between the glide faces 23 of the shoes 20 and the inner face 11' of the cylindrical mantle 10, e.g., from the substantially cylindrical bores 19 through bores (not illustrated) in the piston 17, and onto the respective glide faces 23. With respect to details of passing of the oil, reference is made, by way of example, to FI patent application No. 853,526, in which examples are also given of support between loading piston 17 and glide shoes 20. Reference No. 28 denotes a planar surface opposite the glide surface 23 of the glide shoe 20.

The construction of the adjustable roll 100 in zones is primarily known in and of itself, and is described in this connection only in order to illustrate the background of the present invention, and the subject of application.

In the following, with reference to FIG. 2, stabilization of a hydrostatic glide shoe 20 in accordance with the operation of the present invention, will be described, such stabilization being needed in particular with high speeds of rotation of, and with high loads on the mantle 10. In the prior-art glide shoes, with a high load $F_N$, the oil film between the glide face 23 of the glide shoe 20 and the inner face of 11' of the mantle 10 remains thin in a static situation, whereby, when the speed of the mantle 10 is increased, the frictional force Fu on the glide face 11'/23 increases. The oil film at the front edge of the glide shoe becomes thinner thereat by the effect of a moment M turning the glide shoe 20, because the stabilizing force in the lubrication chambers is not sufficient.

The situation described above is present in the prior-art glide shoes with no stabilization in accordance with the present invention. One prior-art mode of improving stabilizing capacity of the glide shoe 20, involves shifting rearwardly the support point P of the glide shoe 20. However, this results in a drawback that the shoe 20 becomes asymmetric, whereby the mantle 10 of the roll 100 can be rotated in only one direction.

According to the stabilization method of the present invention, the pressure resultant R', which was effective in the prior art, has been shifted to the front side of the supporting point P situated at the middle or mid-point of the glide shoe in the direction of rotation C, to form a pressure resultant R, by providing at the front edge, and, if necessary, also along the rear edge of the glide shoe 20 in the direction of rotation C, chamfers 21 and 22. In such a situation, due to the effect of the chamfer 21 at the front edge of the glide shoe 20, the pressure of the lubricant is increased much more steeply in accordance with the curve $P_1$ (solid line), by the effect of the dynamic wedge phenomenen. The chamfer 21 differs from the curved form of the glide face 23. If a releasing chamfer 22 is used at the rear edge of the glide shoe 20 in the direction of rotation C of the mantle, then the pressure of the lubricant is correspondingly lowered sooner than in the prior art, as also shown by the solid-line curve.

Figure 2:
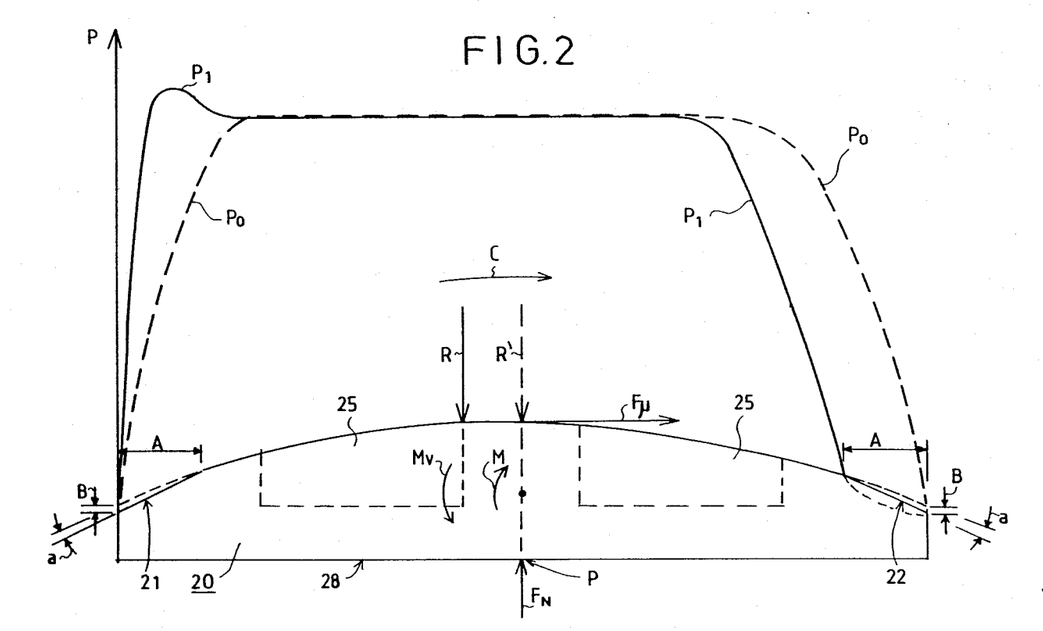
FIG. 2 is a schematic, cross-sectional illustration of a principle of operation of a glide shoe in accordance with the present invention, and of pressure distribution, as well as of locations of pressure resultants in a direction of the shoe and of the roll circumference.

FIG. 2 shows the lubricant pressure curve $P_o$ (broken line) which is effected without the stabilization method and chamfering arrangement 21, 22 of the present invention. When the pressure curves $P_1$ and $P_o$ are compared, it becomes clear that the shifting of the pressure curve from the position $P_o$ to the position $P_1$ in accordance with the present invention, has the effect that the pressure resultant R' which is effective with the pressure curve $P_O$ is shifted rearwardly, i.e. in the direction opposite to the direction of rotation C of the roll mantle, to form a force resultant R.

This force resultant R produces, in the glide shoe 20, a counter-moment Mv which tries to turn the glide shoe 20 around the support point P thereof. By means of the counter-moment Mv, a stabilizing effect in accordance with the present invention is attained, i.e. an increase in the film thickness of the lubricant on the glide face 23 at the front side of the shoe 20 relative to the support point P, i.e. in an area that was critical from the point of view of lubrication in the prior art.

FIGS. 3-10 illustrates some examples of hydrostatic glide shoes 20 in accordance with the present invention. According to FIGS. 3 and 4, a chamfer 21 is provided at a front edge of the glide shoe 20, the extension of the chamfer 21 in a radial plane being denoted by reference character A, with the height of the chamfer being noted by B. The chamfer 21 has a round bottom of a concave radius r (FIG. 4) as well as lateral edges of radius $r_2$ (FIG. 3), which are bordered by the glide face 23. The glide face 23 itself, is constituted by relatively narrow edge portions 26, and of ridges 27 connecting the same, the edge portions 26 and ridges 27 together defining lubrication chambers 25 therebetween, which are of substantially triangular configuration as illustrated, and into which lubricant is passed in a manner known in and of itself, e.g. through the bores 29.

Figure 5:
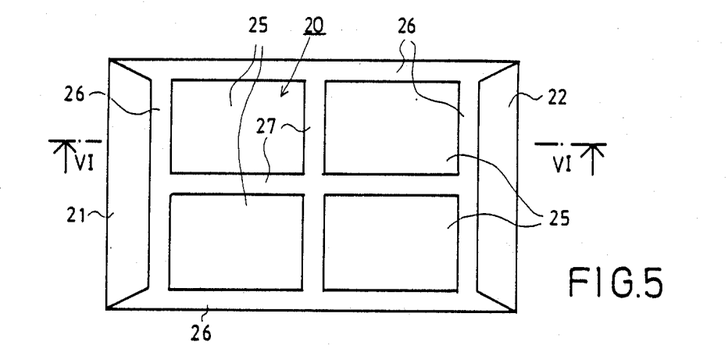
FIG. 5 is a view, similar to FIG. 3, illustrating another, alternative construction of a hydrostatic-glide shoe in accordance with the present invention.
Figure 6:
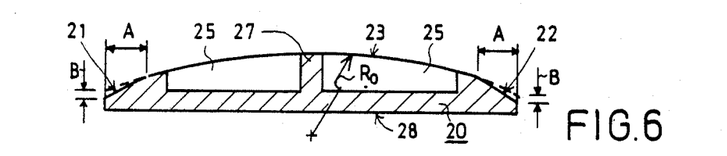
FIG. 6 is a sectional view along line VI—VI in FIG. 5.

According to FIGS. 5 and 6, both the front edge and the rear edge of the hydrostatic glide shoe 20 are provided with chamfers 21 and 22, whose length and height are denoted respectively by characters A and B. The curve radius of the glide face 23 is denoted by $R_o$, which is, at the same time, the radius of the inner face 11' of the mantle 10. The glide face 23 is constituted by relatively narrow edge portions 26, and of connecting ridges 27 substantially perpendicular to one another, the edge portions 26 and ridges 27 together defining rectangular lubrication chambers 25. The area of the chambers 25 is substantially larger than the area of the glide faces 26, 27, which means that a hydrostatic glide face is provided having relatively narrow edge portions 26 and ridges 27 lubricated by means of a flow of pressurized oil generated by static pressure.

Figure 7:
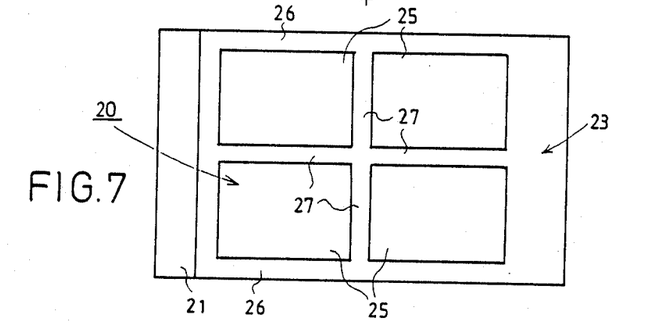
FIG. 7 illustrates a modification of the hydrostatic glide shoe illustrated in FIGS. 5 and 6, as viewed from the side of the glide face thereof.
Figure 8:
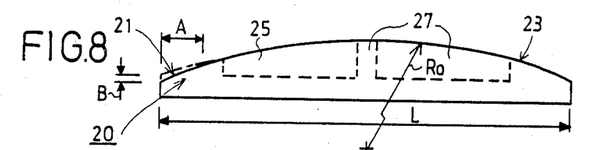
FIG. 8 is a side view of the hydrostatic shoe illustrated in FIG. 7.

FIGS. 7 and 8 illustrate a glide shoe 20 which is, in other respects, similar to the embodiment illustrated in FIGS. 5 and 6, with the exception that a chamfer 21 is only provided at the front edge of the glide shoe 20.

When a chamfer is used at both the front edge and at the rear edge of the glide face 23, of the glide shoe 20, the advantage is obtained that the roll mantle 10 may revolve in both directions as the glide shoes 20 are supported and loaded centrally (support point P in FIG. 2 substantially at the mid-point of the glide shoe 20 ) from the side of the planar face 28.

Figure 9:
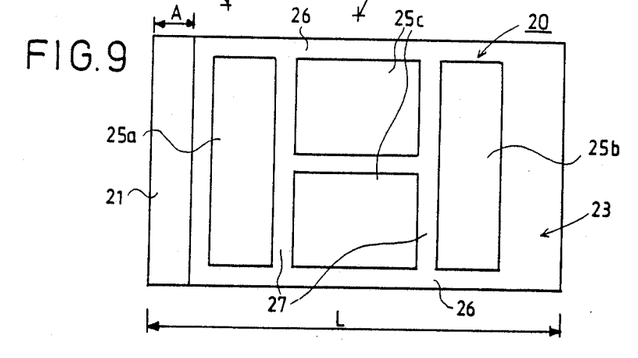
FIG. 9 illustrates a variation of a hydrostatic glide shoe in accordance with the present invention, as viewed from the side of the glide face thereof.
Figure 10:
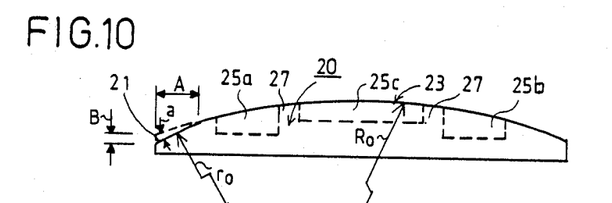
FIG. 10 is a side view of the glide shoe illustrated in FIG. 9.

FIGS. 9 and 10 illustrate a glide shoe 20 in which a chamfer 21 is provided only at the front edge, and in which, after the chamfer 21, a first lubrication chamber 25a is separated by a part 26 of the glide face 23, the chamber 25a extending over substantially the entire width of the glide shoe 20 as illustrated. After the lubrication chamber 25a, two lubrication chambers 25c are situated side by side, between which ridges 27 in the glide face 23 are provided. After the lubrication chambers 25c, a lubrication chamber 25b extends over substantially the entire width of the glide shoe 20. According to FIG. 10, the chamfer 21 is formed along the front edge of the glide face 23 with a convex curved radius $r_o$. The curve radius $r_o$ is substantially smaller than the curve radius $R_o$ of the glide face 23 itself.

Figure 3:
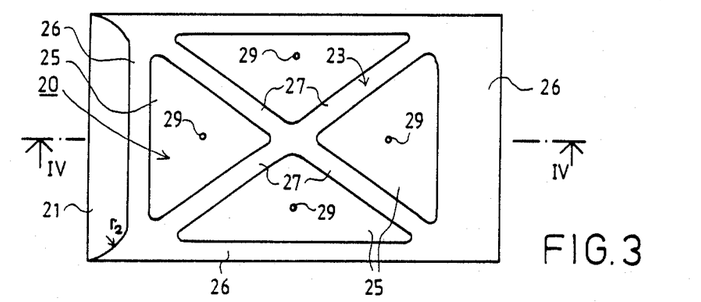
FIG. 3 illustrates a hydrostatic glide shoe in accordance with the present invention, as viewed from the side of the glide face thereof.
Figure 4:
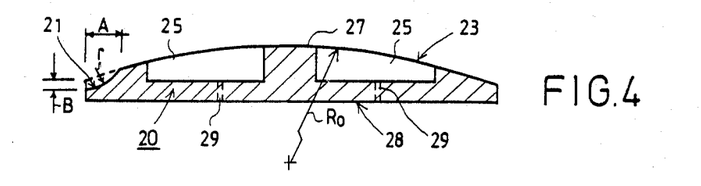
FIG. 4 is a sectional view along line IV—IV in FIG. 3.

The ratio of the length A of the chamfer 21 on the hydrostatic glide shoes 20 described above in connection with FIGS. 3 to 10, to the height of the chamfer, namely ratio A/B, i.e. the magnitude of the wedge angle a of the chamfer 21 at the front edge of the glide shoe 20, and also of the chamfer 22 at the rear edge of the glide shoe 20, if any, is preferably on the order of A/B=100. The border face of the chamfers 21 and 22 is not necessarily planar, but, may be, e.g., a curved face as shown in FIG. 10. The chamfers 21, 22 may have closed sides as illustrated in FIGS. 3 and 4, and in FIGS. 5 and 6, or they may have open sides, as illustrated in FIGS. 8 to 10.

The stabilization method of the present invention may also be used in connection with substantially hydrodynamically lubricated bearings and glide faces. Exemplifying embodiments of these are illustrated in FIGS. 11-14. The hydrodynamic shoes have the advantage that a very good load capacity is obtained at high speeds therewith. However, on the other hand, they involve the drawback that at low speeds, the dynamic effect is not sufficient to form a necessary oil film.

Figure 11:
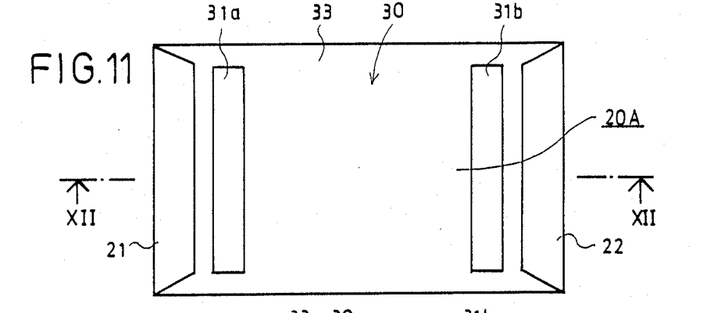
FIG. 11 illustrates a hydrodynamic glide shoe in accordance with the present invention, as viewed from the side of the glide face thereof.
Figure 12:
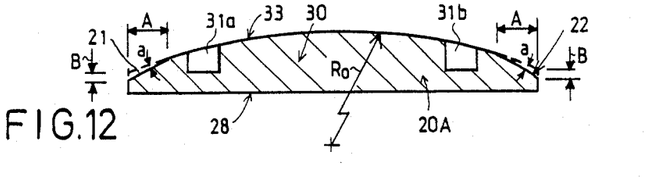
FIG. 12 is a sectional view along line XII—XII in FIG. 11.

In accordance with FIGS. 11-14, the substantially dynamically-lubricated glide shoes 30, 20A, 20B are provided with static pressure chambers which have stabilizing capacity. In FIGS. 11 and 12, transverse pressure chambers 31a and 31b are provided, while in FIGS. 13 and 14, longitudinal pressure chambers 32a, and 32b are placed in proximity of the lateral edges of the shoe. In this manner, the shoes 30 are also operative at low speeds and in a static situation.

Figure 13:
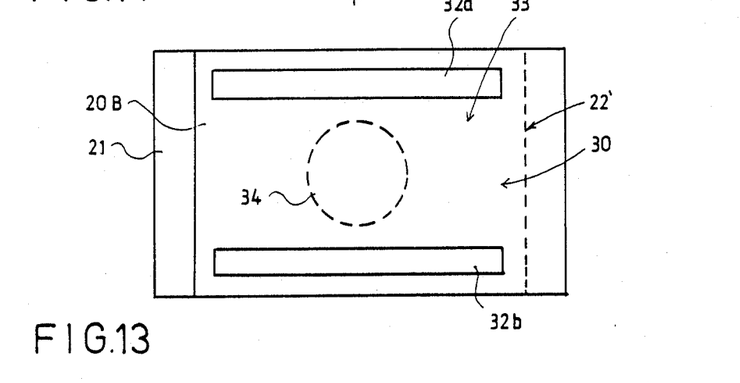
FIG. 13 illustrates a variation of a hydrodynamic glide shoe in accordance with the present invention, as viewed from the side of the glide face thereof.
Figure 14:
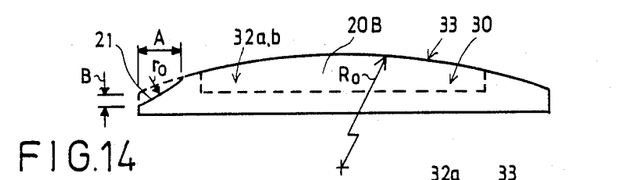
FIG. 14 is a side view of the hydrodynamic glide shoe illustrated in FIG. 13.

The chambers 31a, 31b; 32a, 32b lose their significance for lubrication when the speed of the roll mantle 10 becomes sufficiently high, and the dynamic lubrication effect becomes predominant. In accordance with the present invention, the support point of the shoes 30 may be kept, for example, on the center line of the shoes 30, by provision, in accordance with the present invention, of chamfers 21 and 22 on the front and rear edges of the shoe 30 (FIGS. 11 and 12) or by only providing the front edge with a chamfer 21 (FIGS. 13 and 14). The rear edge may also be provided with a chamfer 22' in FIGS. 13 and 14.

Due to the chamfer 21, a rapid and steep increase in the lubricant pressure is obtained at the front edge of the hydrodynamic shoe 30 (curve $P_1$ in FIG. 2). When a chamfer 22 (22') is used at the rear edge, the pressure can be lowered sooner. In such a situation, the gap at the glide face 33 at the front edge portion of the glide shoe 30 becomes larger, so that the entire shoe 30 can operate with dynamic lubrication in both directions of rotation.

As illustrated in FIG. 13, a pressure chamber 34, if necessary, may be used in the middle area of the glide face 33, such pressure chamber substituting for the oblong pressure chambers 31a, 31b or 32a, 32b. The central pressure chamber may also be used in addition to oblong pressure chambers. In FIGS. 11 and 12, the chamfers 21 and 22 are defined by planar faces, while in FIGS. 13 and 14, the chamfer 21 has a curved radius $r_o$, which is substantially smaller than the curved radius $R_o$ of the glide face 33. In the embodiments of Figs. 11-14, the effective area of the lubrication chambers 31a, 31b; 32a, 32b; and 34, is substantially smaller than the area of the glide face 33 of the hydrodynamic glide shoe 30. The chamfers 21 and 22 may have open ends or ends limited by the glide face 23 or 33.

In order for the intended effects according to the present invention to be obtained, the wedge angle $a$ of the chamfer 21 situated at the front edge of the glide face 23; 33 of the glide shoe 20; 30, and of the chamfer 22, if any, situated at the rear edge, must be relatively small, as rule always smaller than about 3°, preferably smaller than about 1°. In experiments, a wedge angle of, for example, 0.7° in value, has been proven suitable.

The length A of the chamfer may vary, but as a rule, it is preferred to dimension the ratio of the length L of the shoe 20; 30 to a length of the chamfer A, such that the ratio L/A is greater than or equal to 4, most advantageously greater than or equal to eight.

The preceding description of the present invention is merely exemplary, and is not intended to limit the scope thereof in any way.

What is claimed is:

1. Method for stabilizing at least one glide shoe loaded against an inner face of a revolving mantle of a roll, said glide shoe being supported by an articulated joint or equivalent on a piston or equivalent which loads the glide shoe with adjustable pressure and having a glide face, the glide face and inner mantle face being lubricated mainly hydrostatically through lubrication chambers provided in said glide shoe, comprising the steps of providing a wedge space or equivalent within an area of a front edge of the glide shoe with respect to a direction of rotation of the roll mantle, at least one of shifting and steepening the compression pressure applied by the glide shoe to the inner face of the roll mantle through a lubricant, by provision of said wedge space or equivalent, generating a moment in a direction opposite to a direction of a moment produced by frictional force of the glide face, by said at least one of shifting and steepening, increasing thickness of a film of the lubricant within the area of the front of the glide face, by generating the opposite moment, and thus ensuring lubrication of the glide face of the glide shoe and the inner mantle surface within the area of the front edge of the glide face.

2. The method of claim 1, wherein the articulated joint or equivalent supports the glide shoe substantially at a midpoint thereof in the direction of the rotation of the mantle.

3. The method of claim 1, comprising the additional steps of arranging a chamfer or equivalent within an area of a rear edge of the glide face, advancing lowering of the compression pressure by said arranging of the chamfer, and thereby further shifting a pressure resultant towards the front side of a pressure zone of the glide shoe.

4. The method of claim 1, comprising the additional step of providing the glide shoe with at least one hydrostatic lubrication chamber.

5. The method of claim 1, comprising the additional steps of providing the glide shoe in the form of a hydrodynamically-lubricated glide shoe, and providing at least one hydrostatic lubrication chamber in the glide shoe with an effective area substantially smaller than an area of the glide face of the hydrodynamic glide shoe, whereby the glide face and inner mantle face are additionally hydrodynamically-lubricated.

6. A substantially hydrostatic glide shoe for loading against an inner face of a revolving mantle of a roll, comprising a glide face positioned to face the inner mantle surface, at least one hydrostatic lubrication chamber into which pressurized lubricant is passed by which said glide face is lubricated, a chamfer or wedge space situated at a front edge of said glide shoe with respect to a direction of rotation of the roll mantle, wherein said chamfer or wedge space has a shape differing from a curved form of a glide face of said glide shoe, and a wedge angle of said chamfer or wedge space with respect to a tangent of said glide face where said chamfer or wedge space begins is less than about 3°.

7. The glide shoe of claim 6, additionally comprising at least one lubrication chamber into which pressurized lubricant is passed to lubricate a glide face of said glide shoe.

8. The shoe of claim 6, wherein a ratio of length of said chamfer in the rotational direction to height thereof is about 100.

9. The shoe of claim 6, wherein said chamfer comprises a planar or curved border face.

10. The glide shoe of claim 6, wherein said chamfer has a concave radius of curvature.

11. The glide shoe of claim 6, wherein said chamfer has a convex radius of curvature.

12. The glide shoe of claim 6, wherein said chamfer has open lateral sides.

13. The glide shoe of claim 6, wherein said chamfer has a substantially planar surface.

14. The glide shoe of claim 6, wherein said shoe is provided in the form of a dynamically-lubricated glide shoe having at least one hydrostatic pressure chamber, whereby lubrication of said glide face is also carried out hydrodynamically.

15. The glide shoe of claim 6, wherein a ratio of length of said glide shoe in the rotational direction of length of said chamfer is greater than or equal to 4.

16. The glide shoe of claim 15, wherein said ratio is greater than or equal to 8.

17. The glide shoe of claim 6, wherein the wedge angle is smaller than about 1°.

18. The glide shoe of claim 17, wherein said wedge angle is about 0.7°.

19. The glide shoe of claim 6, additionally comprising a second chamfer provided within an area of a rear edge of the glide shoe.

20. The shoe of claim 19, wherein said second chamfer is substantially identical to said first chamfer.

21. The shoe of claim 19, wherein a ratio of length of said second chamfer in the rotational direction to height thereof is about 100.

22. A roll for use in a paper machine, such as a press roll or a calendar roll, comprising said revolving mantle of claim 6, a stationary axle disposed inside said mantle, a plurality of substantially cylindrical bores or equivalent in said axle and adapted to be filled with pressurized medium, a plurality of loading pistons disposed in said respective bores, a plurality of glide shoes, each said glide shoe formed according to said glide shoe of claim 6, and a plurality of articulated joints, each said piston supporting a respective glide shoe through a respective articulated joint, and said pistons adapted to load said respective glide shoes against an inner face of said mantle.

* * * * *